United States Patent Office 3,053,781
Patented Sept. 11, 1962

3,053,781
MASTIC COATING MATERIAL
Irvin J. Steltz, Collingswood, N.J., and Richard W. Young, Phoenixville, Pa., assignors to Benjamin Foster Company, Philadelphia, Pa., a corporation of Delaware
No Drawing. Filed Nov. 17, 1958, Ser. No. 774,116
9 Claims. (Cl. 260—28.5)

This invention relates to an asphalt mastic and more particularly to a protective coating material for application to the exposed metal and the surface of thermal insulation such as, for example, molded insulating blocks and slabs or pipe covering.

Industrial plants such as chemical processing plants often have processing equipment that cannot be sheltered from the weather. Some of this equipment is designed to handle materials at high or low temperatures and therefore requires thermal insulation such as, for example, 85% magnesia block, fiber glass, cellular glass, mineral wool, plastic foams, or vegetable cork board. This insulation is ordinarily applied to the processing equipment in the form of slabs, blocks, batts or molded pipe covering. However, thermal insulation of this character has very little resistance to the weather and must be provided with a protective covering.

Since, in many instances, the insulation is applied to heated equipment, it is very important that the protective covering be resistant to heat. Moreover, the temperature of the insulation often varies, causing the protective covering to expand and contract. This requires that any protective coating be capable of expanding and contracting without deteriorating. Furthermore, since the efficicency of insulating materials is seriously reduced by the presence of water and water vapor, a protective coating should also form a barrier against liquid water and water vapor at the surface of the insulation. Moreover, a protective coating for uses of this kind should preferably have fire retardant properties, and any volatile solvents contained therein should be only difficultly flammable so that their evaporation from the applied coating does not constitute a fire hazard.

Asphalt mastics have heretofore been used for protective purposes; however, such mastics have not been entirely satisfactory primarily because they are flammable during application, have relatively poor fire resistance after application and have poor heat resistance. Therefore, it has been necessary to take precautions that no welding or open flames are placed in the vicinity of such mastics during application because of their fire hazard in the wet state.

Furthermore, their poor heat resistance has caused the coatings to become hard and brittle in a relatively short period of time when used on hot surfaces and ultimately to crack and peel off the surface of the insulation.

Moreover, because these prior mastics have such poor fire resistance, they tend to propagate the spread of flame when exposed in service to a fire.

It is therefore one object of the present invention to provide an improved asphalt base protective covering for thermal insulation of the above type that will be resistant to heat.

Another object of the present invention is to provide an improved asphalt base protective covering that is capable of expanding and contracting without deteriorating.

Another object of the present invention is to provide an improved asphalt base protective covering that is an effective water and water vapor barrier.

Another object of the present invention is to provide an improved asphalt base protective covering which essentially eliminates the fire hazard during storage, during application, during drying and after the mastic has dried on the surface to which it has been applied.

Other objects and many of the attendant advantages of this invention will be readily appreciated and understood by reference to the following detailed description and claims.

This invention comprises a binder component which is present in a proportion of about 20–80% by weight relative to the total composition, a pigment component, and a solvent component consisting of sufficient volatile organic solvents to provide ease of application. The binder consists essentially of (1) bitumens such as natural or petroleum asphalts, tar, pitch or a combination thereof, (2) a resinous flame retardant chlorinated compound, (3) a tackifier such as natural or synthetic latex. The pigment component preferably consists of mineral thickeners such as mica, talc, pulverized slate, and short asbestos fibers. The volatile solvent component consists essentially of a mixture of flammable petroleum solvents and non-flammable halogenated solvents.

The natural asphalt or asphaltite may be typified by gilsonite. This is a species of bitumen, comparatively hard and non-volatile, composed of hydrocarbons substantially free from oxygenated bodies and crystallizable paraffins. The particular grade used in this case is known commercially as Gilsonite Selects and has a melting point range of 285° to 300° F. In the present use, this natural asphalt is dissolved in the solvents and blended with a portion of the petroleum asphalts.

The other bitumens covered by this invention are petroleum asphalts obtained from steam-refined and blown petroleum residue, and residual tars and pitches obtained from the distillation of bituminous and other organic substances such as petroleum, bituminous coals, wood, or vegetable oils. The bitumens obtained by this method may be used individually or combined in a homogeneous mixture having a softening point in the range of 120° to 200° F. These bitumens may be dissolved individually or together in petroleum solvents to form "cutbacks," which can then be further blended with other bitumen solutions to obtain the softening point desired.

It is desirable in the practice of this invention to combine the hard natural asphalt, petroleum asphalt, tar or pitch of high softening point with the softer petroleum asphalt. The latter, if used without the former, would provide a mastic that is too soft and sticky, so that the mastic would be too easily damaged when subjected to mechanical abuse and would flow under heat. The bitumens must be carefully selected for maximum resistance to oxidation and hardening after long exposure to heat.

An asphalt coating with the fire resistant properties described in this invention can be prepared and used with the softer petroleum asphalt only where a soft coating is not objectionable and the coating will not be subjected to mechanical abuse. The hard natural asphalts cannot be used as the sole bitumen component as the coating will be too hard and brittle and easily damaged. Furthermore, the mastic would have insufficient flexibility and any appreciable expansion or contraction of the underlying vessel or processing equipment would crack the mastic. These disadvantages are overcome by blending with the more flexible, softer petroleum asphalts.

The resinous flame retardant chlorinated compound is incorporated into the solution of asphalts (bitumens). The chlorinated compound may be preferably chlorinated paraffin wax or chlorinated biphenyls, terphenyls or polyphenyls but other halogenated hydrocarbons may be used. The contained chlorine of this ingredient should be above 50% and preferably in the range of 60 to 70%. Those flame retardants which are compatible with the other ingredients of the binder component may be selected from a series of flame retardant chlorinated paraffins or of chlorinated biphenyls, terphenyls or polyphenyls, and it is important that they be selected for their resistance to oxidation, hardening and decomposition when exposed to heat.

The chlorinated paraffin is a white, pulverized resinous product having a refractive index of 1.535 and a particle size passing 90% by weight through a 50 mesh sieve (U.S.). It has a specific gravity of 1.64 and a melting point of 90° C. It contains 70% chlorine by weight and is represented by the average chemical formula $C_{24}H_{29}Cl_{21}$. It is insoluble in water, soluble in hydrocarbons, ketones, esters, nitroparaffins, and chlorinated hydrocarbons. It does not oxidize, polymerize, or condense and decomposes at 135° C. with the evolution of hydrogen chloride.

Among the other halogenated hydrocarbons, such as the chlorinated biphenyls, terphenyls, polyphenyls, etc., the preferred compounds are insoluble in water, glycerine, glycols, and soluble in most common organic solvents, thinners, and oils. They do not oxidize, polymerize, or condense and decompose above 335° C. with the evolution of hydrogen chloride. The preferred grade has a refractive index of 1.660–1.675, a melting point of 100 to 105° C., and is supplied in solid form at 60% chlorine by weight.

In the presence of calcium carbonate, decomposition by heat of these chlorinated compounds is controlled and the reaction products ($CO_2$ and $CaCl_2$) act as flame retardants. The non-flammable gases resulting from the decomposition of these mastic ingredients in the flame area serve to dilute the oxygen in the area of the fire to form a non-flammable mixture which retards combustion. Water of crystallization discharged by heat from pigments and fillers is another reaction product which serves to dilute the oxygen in the combustion zone.

The tackifying latex is included for the purpose of viscosity control and to increase the tack of the coating during application. It may be the synthetic type such as neoprene or butadiene-styrene latex or of the natural rubber type concentrated or treated latex. The natural rubber latex preferably used is concentrated by evaporation to about 73% solids, and has a viscosity of 1,000 to 3,000 centipoises and is preserved against bacterial decomposition with potassium hydroxide.

The use of latex in the composition is an effective method of introducing elastomeric or rubber resins to increase the viscosity and tack in the coating without detracting from its heat flow properties. The fine particle size of the rubber present in the latex permits a more complete distribution and dispersion of the resin particles throughout the mastic, and thereby provides the required viscosity and tack in the mastic through addition of very small quantities of latex. Some resinous tackifiers could be used for this purpose, but in the larger quantities required to be effective, would adulterate the mastic and detract from heat resistance, fire-resistance, and flexibility.

The pigment component of this composition preferably consists of both fibrous and non-fibrous fillers. Included among the non-fibrous fillers are ground muscovite mica, antimony oxide, calcium carbonate, and pulverized slate, calcium silicate, or other water-insoluble silicaceous materials. If desired, a powered metal such as aluminum flake can be included among the non-fibrous fillers in order to effect a different color. Another non-fibrous filler is ground vegetable cork, expanded vermiculite or perlite. Antimony oxide is preferably added since it co-acts with the chlorinated resin in the vehicle component to complement their flame retarding action.

It it is desired to improve the color and light reflectivity of the mastic, a metallic pigment such as a leafing grade of polished aluminum powder or paste may be incorporated in a quantity of about 20 to 75% of the total weight of the pigment. When the mastic is used as a weather-coating and is exposed to sunlight, the aluminum serves to reflect most of the sun's rays, thereby lowering the temperature of the surface and improving the durability of the mastic.

In general, the particle sizes of the non-fibrous ingredients of the pigment component are not critical but for spraying purposes they should be less than one-thirty-second inch diameter or length in order to avoid clogging the spray equipment.

The fibrous filler consists of asbestos forming a fibrous mat which holds together the other components of the mastic or blown or extruded glass fibers. One grade of asbestos which is preferred for use with this invention is Canadian Classification 7R, a chrysotile fiber, which has a maximum fiber length of about one-sixteenth inch. However, asbestos up to Canadian Classification 5R which has a maximum length of about one-quarter inch, may be utilized in accordance with this invention. Fibers longer than this are not utilized in compositions that are to be applied by spraying since the longer fibers tend to clog the spraying equipment. Fibers longer than one-quarter inch also trowel with difficulty. However, fibers much shorter than one-sixteenth inch are quite suitable for this invention although a higher proportion is required.

The solvent component is used to liquify the composition for ready application without heating, and the amount incorporated depends upon the proper viscosity desired for the various methods of application. After application, the solvent evaporates from the film, leaving a fire-resistant protective weathercoating.

When using common asphalt cutback coatings a definite fire hazard exists during storage, during the application of the mastic and during drying of the applied mastic. For reasons of safety it is necessary to discontinue all adjacent welding, cutting, or grinding, or any operation producing a spark or flame while flammable asphalt cutback coatings are being applied, or when an open container of the asphalt coating is in the area. The mastic coating of this invention incorporates the use of special non-flammable solvents to abate or essentially eliminate these hazards.

The solvents used as the diluent for this mastic consist preferably of a blend of flammable and non-flammable solvents. The common flammable solvents which may be used are petroleum solvents such as mineral spirits, xylol, toluol. These must be present to provide proper flow and application properties. These are blended with the non-flammable halogenated solvents to form the aforesaid desired blend and properties. The preferred non-flammable halogenated solvents are inhibited 1.1.1-trichloroethane having a specific gravity of about 1.33, and a boiling range of about 72–88° C., and perchlorethylene, which is tetrachloroethylene, having a specific gravity of about 1.62 and a boiling range of about 120–122° C. when blended and used with the flammable solvents in the proper critical proportions, these halogenated solvents will co-evaporate (during product application) at a rate sufficient to prevent the formation of a flammable vapor mixture. They must be selected with the proper vapor pressure to evaporate as a non-flammable mixture until the film is substantially dry, at which time the fire-resistant vehicle ingredients predominate and prevent any propagation of flame due to fire exposure.

Certain proportions in the solvent component are critical. To effectively reduce the flammability of the composition in the wet state, it is necessary to have a minimum of 40% by volume of the total solvent component present as halogenated solvents. It is further desirable to have the halogenated solvents present on the order of 30 to 60% by weight as 1.1.1-trichloroethane and 40 to 70% as perchloroethylene. The flammable portion of the solvent is present in the order of 0 to 60% by volume of the solvent component. Of this flammable solvent 20 to 100% should be composed of xylol or a similar solvent in the boiling range of 270 to 389° F.

The volatile solvents serve to liquefy the mixture of the binder and pigment components to facilitate application. The solvent component is present as 10 to 60% by weight of the total composition.

The proportions of ingredients in the composition may be varied somewhat, but we have found that they must be restricted within certain critical limits for maximum effectiveness. In the binder component, the bitumens (natural or petroleum asphalt) preferably comprise 65–90% by weight of the total solids in the binder component, the resinous chlorinated flame retardant 10–35% by weight, and the latex tackifier 0–1% by weight.

In the pigment component, the relative amounts and types can vary considerably. However, preferably, the pulverized slate should be present on the order of 30 to 70% by weight of the total pigment, ground mica 5 to 15% by weight, calcium carbonate 5 to 15% by weight, antimony oxide 5 to 15% by weight, and asbestos 15 to 40% by weight.

The binder may be used as a primer without pigment, if desired, but the inclusion of the pigment is preferably added as 10 to 50% by weight of the total composition.

The ingredients of this invention are preferably combined by admixture at ambient temperature by dissolving the natural asphalts and the chlorinated flame-retardant in the solvent, adding the petroleum asphalt cutback in solvent, the non-fibrous pigments, the fibrous pigments and finally the latex tackifier.

The heat resistant chlorinated flame-retardant compound is essential to contribute fire resistivity to the dry film while the halogenated solvents provide fire resistivity in the wet state permitting application without danger of accidental ignition from sparks from welding or other operations carried on adjacent to the application of the coating. Consequently, the present invention adequately protects the coating in both its liquid and cured forms and also provides the optimum combination of toughness, flexibility and hardness for most weather conditions and insulation surface temperature conditions.

The following examples serve to illustrate the invention.

*Example I*

| Components: | Percent by wt. |
|---|---|
| Petroleum asphalt | 28.0 |
| Gilsonite | 2.0 |
| Chlorinated biphenyl | 10.0 |
| Natural rubber latex | 0.1 |
| Antimony oxide | 2.0 |
| Calcium carbonate | 2.0 |
| Pulverized mica | 4.0 |
| Pulverized slate | 24.0 |
| Asbestos fibre | 6.0 |
| 1.1.1-trichloroethane | 5.9 |
| Perchloroethylene | 6.0 |
| Petroleum distillate | 10.0 |

This formula yields a material that could be readily applied with standard mastic spray equipment with the usual mastic application techniques.

*Example II*

| Components: | Percent by wt. |
|---|---|
| Petroleum Asphalt | 19.0 |
| Coal tar pitch | 5.5 |
| Gilsonite | 3.5 |
| Chlorinated paraffin | 8.4 |
| Natural rubber latex | 0.1 |
| Antimony oxide | 4.0 |
| Calcium carbonate | 4.0 |
| Pulverized mica | 6.0 |
| Pulverized slate | 18.0 |
| Asbestos fibre | 12.0 |
| 1.1.1-trichloroethane | 4.0 |
| Perchloroethylene | 8.0 |
| Petroleum distillate | 7.5 |

This typical formula has a viscosity such that it can be readily applied by trowel.

*Example III*

| Components: | Percent by wt. |
|---|---|
| Petroleum asphalt | 2.10 |
| Rosin pitch | 4.0 |
| Gilsonite | 3.0 |
| Chlorinated biphenyl | 5.4 |
| Natural rubber latex | 0.1 |
| Antimony oxide | 3.0 |
| Calcium carbonate | 3.0 |
| Pulverized mica | 4.0 |
| Pulverized slate | 18.0 |
| Asbestos fibre | 22.0 |
| 1.1.1-trichloroethane | 4.9 |
| Perchloroethylene | 5.0 |
| Petroleum distillate | 6.6 |

This formula has a viscosity suitable for application by putty knife or pump extrusion, as a flashing compound or joint filler auxiliary to standard spray grade mastic coating.

*Example IV*

| Components: | Percent by wt. |
|---|---|
| Petroleum asphalt | 20.0 |
| Wood pitch | 6.0 |
| Gilsonite | 2.0 |
| Chlorinated biphenyl | 11.0 |
| Butadiene-styrene latex | 0.1 |
| Antimony oxide | 2.0 |
| Calcium carbonate | 3.0 |
| Pulverized mica | 2.0 |
| Pulverized slate | 12.0 |
| Aluminum paste | 15.0 |
| Asbestos fibre | 6.0 |
| 1.1.1-trichloroethane | 5.9 |
| Perchloroethylene | 6.0 |
| Petroleum distillate | 9.0 |

This formula incorporates a leafing type aluminum flake pigment for heat reflectance and color improvement.

The mastic compositions of this invention may be applied to the surface to be treated either by spraying or troweling as indicated above. If the mastic is to be applied to conventional 85% magnesia molded insulation, a spray primer composed of the bitumens, chlorinated fire retardant resins and halogenated solvents (without pigment) is first applied to the insulation to lay the dust that is usually present on the block. A woven fibrous glass fabric or wire netting such as, for example, poultry wire, is then stretched over the exposed surface on the insulation and secured in position, and the mastic is then applied to the insulation and netting. The mastic is thereby keyed into the netting and the netting permanently holds the mastic structure in place. For use on some kinds of insulation, it is not necessary to apply a primer; but in any event it is desirable to utilize wire netting, woven fibrous glass, or the like, as heretofore described.

We claim:

1. A mastic composition comprising a binder and a diluent for the binder, said binder comprising 65-90 percent by weight of bitumens, 10-35 percent by weight of a resinous flame retardant compound and 0.1 to 1.0 percent by weight tackifier, the bitumens comprising a mixture of 2-10 percent of natural asphalt by weight of total solids in the binder and 55-85 percent of petroleum asphalt by weight of total solids in the binder, the flame retardant compound comprising a chlorinated organic resinous compound selected from the group consisting of chlorinated paraffin wax and chlorinated biphenyl, terephenyl and polyphenyls wherein the chlorine in the compound exceeds 50 percent by weight thereof, the tackifier containing unvulcanized latex, and the diluent consisting essentially of a volatile mixture of non-flammable halogenated organic solvents and flammable petroleum solvents, the non-flammable solvents being present in a proportion of at least 40 percent by volume of the total diluent.

2. The compound of claim 1 wherein from 20-100 percent by volume of the flammable portion of the diluent comprises a compound having a boiling point of about 270-289° F.

3. The composition of claim 1 wherein the diluent comprises about 10-60 percent by weight of the total composition.

4. The composition of claim 1 wherein 30-60 percent of the halogenated solvents has a boiling range below that of any flammable solvents present.

5. The composition of claim 1 wherein the petroleum asphalt has a softening point of between 120-200° F.

6. The composition of claim 1 wherein a pigment is included, said pigment being a member of the group consisting of fibrous and non-fibrous fillers.

7. The composition of claim 1 wherein a pigment is present in the composition, said pigment comprising a fibrous filler consisting essentially of asbestos fibers and at least one non-fibrous filler selected from the group consisting of mica, antimony oxide, cork, calcium carbonate, pulverized slate and powdered aluminum.

8. The composition of claim 1 wherein a pigment is present in the composition, said pigment comprising about 30-70 percent by weight pulverized slate, about 5-15 percent by weight mica, about 5-15 percent by weight calcium carbonate, about 5-15 percent by weight antimony oxide, and about 15-40 percent by weight asbestos.

9. The composition of claim 1 wherein asbestos fibers having an average length of $\frac{1}{32}$ to $\frac{1}{4}$ inch are incorporated into the composition in the amount of 15-40 percent by weight.

References Cited in the file of this patent

UNITED STATES PATENTS

| | | |
|---|---|---|
| 2,546,659 | Sussenbach | Mar. 27, 1951 |
| 2,669,521 | Bierly | Feb. 16, 1954 |
| 2,734,882 | Kirsch | Feb. 14, 1956 |
| 2,830,919 | Schatzel | Apr. 15, 1958 |
| 2,880,127 | Spokes | Mar. 31, 1959 |

FOREIGN PATENTS

| | | |
|---|---|---|
| 453,843 | Great Britain | Sept. 18, 1936 |